US006573470B1

(12) United States Patent
Brown et al.

(10) Patent No.: US 6,573,470 B1
(45) Date of Patent: Jun. 3, 2003

(54) WELD GUN HEAT REMOVAL (75) Inventors: Ronald C. Brown, Clarkston, MI (US); Gregory J. Korshurba, Macomb, MI (US); Arthur C. Mason, Harrison Township, MI (US); Stephen D. Tracey, Northville, MI (US); James Bronce Henderson, III, Bloomfield Hills, MI (US); John K. Baysore, Grosse Pointe Farms, MI (US)

(73) Assignee: DCT, Inc., Sterling Heights, MI (US)

( * ) Notice: Subject to any disclaimer, the term of this patent is extended or adjusted under 35 U.S.C. 154(b) by 50 days.

(21) Appl. No.: 09/715,346

(22) Filed: Nov. 17, 2000

Related U.S. Application Data (63) Continuation-in-part of application No. 09/321,931, filed on May 28, 1999.
(60) Provisional application No. 60/166,595, filed on Nov. 19, 1999, provisional application No. 60/166,512, filed on Nov. 19, 1999, provisional application No. 60/166,574, filed on Nov. 19, 1999, and provisional application No. 60/095,385, filed on Aug. 5, 1998.

(51) Int. Cl.[7] .............................................. B23K 37/02
(52) U.S. Cl. ................................ 219/86.51; 219/86.41; 219/86.33; 219/86.31
(58) Field of Search ........................... 219/86.51, 86.41, 219/86.33, 86.31, 108, 90, 91.1, 102, 120

(56) References Cited

U.S. PATENT DOCUMENTS

| 4,162,387 A | 7/1979 | De Candia |
| 4,280,182 A | 7/1981 | Mickowski |
| 4,503,312 A | 3/1985 | Nakata et al. |
| 4,577,085 A | 3/1986 | Burgher et al. |
| 4,661,680 A | 4/1987 | Swensrud |
| 4,760,633 A | 8/1988 | Dacey, Jr. |

(List continued on next page.)

FOREIGN PATENT DOCUMENTS

| DE | 2 305 529 | | 8/1974 |
| DE | 19740814 | * | 8/1974 |
| DE | 44 32 475 A1 | | 3/1995 |
| EP | 0 350 013 A | | 1/1990 |
| EP | 0 649 700 A1 | | 9/1994 |
| FR | 2 118 096 | | 12/1971 |
| FR | 2 447 126 | | 1/1979 |
| FR | 2447126 | * | 8/1980 |
| FR | 2 692 507 A | | 12/1993 |
| JP | 56160885 | | 12/1981 |
| JP | 58165307 | | 9/1983 |
| JP | 61150786 | | 7/1986 |

OTHER PUBLICATIONS

PCT International Search Report in International Application No. PCT/US99/16437 dated Oct. 10, 2000.
PCT International Search Report in International Application No. PCT/US00/31540.
IBM Technical Disclosure Bulletin, vol. 17, No. 11, Apr. 1975 (1975-04), XP-000918142, "Welding Electrode and Holder".
De-Sta-Co (A Dover Resources Company) Brochure; pp. 53-54.
ISI Power & Manual Industrial Clamps; The ISI Companies; Copyright 1989.

*Primary Examiner*—M. Alexandra Elve
(74) *Attorney, Agent, or Firm*—Rader, Fishman & Grauer PLLC (57) ABSTRACT

A weld gun includes internal, external and structural devices that dissipate heat generated at electrode tips without requiring a continuous external source coolant. The internal devices utilize heat pipes within the electrodes to transfer heat to secondary heat removal features. A heat capacity on the weld gun contacts external heat sinks to directly conduct heat away from the weld gun after a completed weld cycle. Alternatively, the heat sink, the heat pipe and the secondary heat removal features are combined structurally on the weld gun arm by forming the arm from a plurality of plates separated by an air gap.

26 Claims, 9 Drawing Sheets

U.S. PATENT DOCUMENTS

| | | |
|---|---|---|
| 4,813,125 A | 3/1989 | Dacey, Jr. |
| 4,827,595 A | 5/1989 | Dacey, Jr. |
| 4,835,730 A | 5/1989 | Shimano et al. |
| 4,852,047 A | 7/1989 | Lavallee et al. |
| 4,884,431 A | 12/1989 | Dacey, Jr. |
| 4,894,908 A | 1/1990 | Haba, Jr. et al. |
| 4,896,087 A | 1/1990 | Omaga et al. |
| 4,912,343 A | 3/1990 | Stuart |
| 4,928,388 A | 5/1990 | Dacey, Jr. |
| 4,931,617 A | 6/1990 | Toyoda et al. |
| 5,014,208 A | 5/1991 | Wolfson |
| 5,025,390 A | 6/1991 | Daggett |
| 5,050,088 A | 9/1991 | Buckler et al. |
| 5,099,158 A | 3/1992 | Stuart et al. |
| 5,103,551 A | 4/1992 | Tamura et al. |
| 5,132,601 A | 7/1992 | Ohtani |
| 5,174,489 A | 12/1992 | Mason |
| 5,187,398 A | 2/1993 | Stuart et al. |
| 5,229,568 A | 7/1993 | Gobez et al. |
| 5,285,373 A | 2/1994 | Watanabe et al. |
| 5,293,157 A | 3/1994 | Yakou |
| 5,321,255 A | 6/1994 | Kakinami et al. |
| 5,341,054 A | 8/1994 | Tal et al. |
| 5,378,868 A * | 1/1995 | Burkhardt et al. ............ 219/89 |
| 5,400,943 A | 3/1995 | Rossi |
| 5,436,422 A | 7/1995 | Nishiwaki et al. |
| 5,504,299 A | 4/1996 | Heckendorn |
| 5,632,911 A | 5/1997 | Wigle et al. |
| 5,742,022 A | 4/1998 | Crawford et al. |
| 6,359,249 B1 * | 3/2002 | Brown et al. ............ 219/86.51 |

* cited by examiner

WELD GUN HEAT REMOVAL

This application claims the priority benefit of the following co-pending applications: U.S. Provisional Patent Application Serial No. 60/166,595 filed on Nov. 19, 1999; U.S. Provisional Patent Application Serial No. 60/166,512 filed on Nov. 19, 1999; U.S. Provisional Patent Application Serial No. 60/166,574 filed on Nov. 19, 1999; U.S. patent No. 6,359,249, issued Mar. 19, 2002, in turn claiming priority from U.S. Provisional Patent Application Serial No. 60/095,385 filed Aug. 5, 1998, and now expired the contents of which are incorporated in their entirety. Applicant also notes the existence of U.S. patent application Ser. No. 09/557,896, filed Apr. 21, 2000, and claiming priority from U.S. Pat. No. 5,742,022, filed Apr. 19, 1995, and from U.S. Pat. No. 6,066,824, filed Apr. 20, 1998, all commonly owned with this application and incorporated herein by reference in their entirety.

FIELD OF THE INVENTION

The present invention relates to dissipation of heat generated at the electrode tips and in the arms of electric spot welding guns. More particularly, the invention relates to construction of electric welding guns to provide for heat removal during welding operations without requiring a continuously supplied cooling source.

BACKGROUND OF THE INVENTION

Resistance spot welding utilizes the flow of electricity to permanently join two or more overlapping metallic workpieces to one another. Typically, the metallic workpieces are placed between two opposing electrodes of a spot welding system gun assembly. The electrodes are then forced together until their tips contact the outer surfaces of the workpieces at a pressure sufficient to sandwich the workpieces and ensure an adequate electrical contact between the electrodes and the workpieces. Then an electrical current is induced to flow from one electrode tip to the other electrode tip by way of the sandwiched workpieces. The workpieces act as conductors in the resulting electrical circuit, and resistance to the flow of electrical current at the interfaces between the metals generates heat. The affected metal of each workpiece selectively becomes molten, and interacts with molten metal of an adjacent workpiece to form a weld nugget that permanently bonds the workpieces together at the point of electrode tip contact. Additional heat is generated due to contact resistance between the electrode tips and the work piece, as well as by joule heating in the arms themselves. The heat generated must be dissipated to avoid thermal overload and subsequent gun malfunction in production applications.

A number of factors relate to the creation of a weld nugget, including the force and area of contact between the electrode tips and workpieces, the level of current flow, the length of time that the current flow lasts, degree of workpiece imperfection, and even the condition of the electrode tips themselves.

The prior art teaches the importance of creating an adequate weld nugget. Therefore, spot welding systems are over-configured to generate a weld nugget even if there are significant workpiece imperfections by having high force, current levels, and current application times. Yet, many resulting welds are still imperfect. Therefore, typically, somewhere on the order of approximately one quarter of all welds in a workpiece are added to insure adequate structural integrity.

Further, such overcompensation for possible workpiece imperfection results in significantly higher deformation (mushrooming) of the electrode tips at the point of contact between the tips and the mating workpieces. If the electrode tips are inadequately cooled, the electrodes experience excessive tip wear, deformation, tip sticking and even tip melting, all of which contribute to poor weld quality and increased equipment maintenance. The generation of significant heat at the electrode tips also results in significant heat built up in the welding control unit, transformer, and secondary (i.e., high current) cable disposed between the electrodes and the transformer.

Moreover, the application of continuous significant electrode force upon the sandwiched workpieces requires the use of significant sources of compressed air. The compressed air provides for the actuation of various air cylinders to position the welding gun electrodes with respect to the workpieces to be sandwiched therebetween and to generate force.

The use of complex air and water cooling systems with their multitude of hoses and corresponding pipes, valves, and the like, in combination with the controllers and supply mechanisms, greatly increases manufacturing expense. It has been estimated that somewhere on the order of approximately one quarter to one half of the total cost of a spot welding system can be attributed to the use of air and water-cooling circulation systems. It is known to provide alternatives to air-actuated cylinders to position the weld gun, thereby eliminating come of the hoses. However, motor actuated or electrically actuated weld guns produce additional heat that must be removed from the weld gun assembly.

To complicate matters, typical spot welding systems must be custom designed, built, and tested, requiring the services of numerous skilled trades. Following initial construction and testing, the verified welding systems are then torn-down, transported, and rebuilt at a manufacturing facility where they will actually be used. Such intermediate steps significantly increase the time lag and cost in providing a complete electric weld system. Moreover, both the design and testing facility, as well as the final manufacturing facility, must make significant capital and continuous monetary investments in air and water-cooling circulation systems, customizing them for each individual spot welding system.

Nor is the complexity and cost limited to manufacturing of a spot welding system itself. The ongoing maintenance problems of requiring significant water-cooling and air circulation systems are extensive. It has been estimated that on the order of eighty percent of the down time of a typical spot welding system may be attributed to the host of air hoses, and feed and return cooling water hoses in combination with the corresponding pipes, valves, and other components.

There are additional costs to requiring complex water and air supply circulation systems. Each spot welding system becomes unique. Each length of hose, each bend in a pipe or conduit, and each selected placement for various cooling water fittings is necessarily tailored to the particular welding system. The kinematics of the host of hoses (pejoratively referred to as "spaghetti") cannot be accurately predicted or modeled. Accordingly, the robot movements in each robotic work cell must be inputted on-site, step-by-step, to ensure that hoses do not become entangled. To further exacerbate the problem, the resulting "window" in which a robot arm may move to reach, for example, a weld point, is significantly reduced, again due to the proliferation of the compressed air and water hoses and associated components.

Thus, the time to program a robot arm is extensive. Even after programming, the resulting process time to process workpieces is often significantly increased by having a small movement window.

A multitude of factors goes into the design of a spot welding gun. For a given force that needs to be exerted by a weld gun, the factors that enter into the design of the weld gun include the strength of the actuator necessary to effect the weld, the speed with which the actuator can close the arms of the weld gun, the force that the actuator can exert on those arms at a speed commensurate with the desired output of the device, and the speed with which the device can create any particular weld and then move on to the next weld to be performed. The speed with which the weld gun can dissipate the heat generated during the welding process is a contributor to this final factor. Should the weld gun become overheated, the weld tips can become damaged or the weld gun can get out of alignment due to warping. Materials being welded can also be more susceptible to high temperatures generated during the welding process.

A weld gun designer traditionally had only two options available in keeping the temperatures of the welding apparatus within tolerances. The first is to extend the cycle times such that the apparatus has time to cool, thereby keeping the apparatus temperature down. The second is to provide a structure whereby the apparatus is cooled either continually or cyclically during the manufacturing process. As noted above, such a cooling mechanism, however, adds drastically to the cost of the apparatus and to the cost of operation, and the extra accoutrements that go with such an apparatus can hinder the flexibility and mobility of the apparatus.

Accordingly, an all-electric resistance welding system is desired that eliminates the need for extensive water fittings or other continuously available cooling apparatuses to simplify the construction, installation and maintenance of the welding system, and to improve the quality and reliability of a weld.

SUMMARY OF THE INVENTION

Heat generated at the electrode tips or in other areas of electric welding guns, such as in the welding control unit, transformer, and secondary (i.e., high current) cable disposed between the electrodes and the transformer, is dissipated through a combination of inherent internal, external and structural features. The features may be used alone, or more preferably, are used in combination to maximize heat removal without the need for a continuously renewed cooling mechanism such as water flow. In general, a weld gun includes a pair of opposed electrode tips. In a first assembly, each electrode tip includes an internal coolant reservoir containing a predetermined amount of coolant. A heat tube interconnects each reservoir to a location remote from the electrode tip. In operation, the coolant in each reservoir vaporizes as it absorbs heat generated at the tip. The resulting heated vapor travels through the beat tube to the remote location, where heat is removed from the vapor, causing the vapor to condense back to liquid. The liquid is then returned to the reservoir. In one embodiment, the liquid is directly and continuously returned to the reservoir through the heat tube, thereby creating a closed loop cooling system. In another embodiment, the condensed liquid returns to a holding tank that interconnects with the reservoir. In this embodiment, a dose of liquid coolant is supplied to each reservoir at predetermined times in a welding cycle to ensure that sufficient liquid remains in the reservoir to adequately cool the electrode tip. The dose is supplied as the liquid in the reservoir depletes due to vaporization of the liquid as it absorbs heat.

In a second assembly, the electrode tip is provided with a heat capacity capable of storing the heat generated during a weld cycle of a predetermined length, wherein a weld cycle is one or more welds made on a work piece. At the end of the weld cycle, the electrode tip is interconnected to an external cooling device that directly conducts stored heat away from the heat capacity, thereby directly removing the heat from the electrode tip. The external cooling device may also include secondary cooling mechanism to dissipate the heat conducted away from the heat source, thereby increasing heat capacity. The external heat sink may be shaped to receive electrode tips of the weld gun, or it may be moved to conform with and contact an exterior surface of the weld gun.

In a third assembly, the electrode tip is interconnected structurally to a cooling mechanism such that heat generated at the weld tip is conducted through the electrode tip structure to a secondary cooling mechanism that is cooled by convection to ambient air. In one form, the secondary cooling mechanism includes external fins. The fins may be used in combination with the heat tube of the first assembly, or may be formed directly adjacent the device tip. In a preferred form, the weld gun arm is constructed from a number of thin individual plates spaced to allow air convection cooling between them. During a weld cycle, heat is dissipated from the electrode tip back to the plates of the weld gun arm by natural conduction or other means, and is further transferred to ambient air by convection cooling from the plates. The plates are joined at connection points to maintain spacing and may include cross pins to provide buckling strength. By designing and building the weld gun arm itself from multiple plates, more surface area is provided for cooling without excessive machining of material. The plates provide both structural support for the weld tip while also acting as fins for the dissipation of heat generated at the tip. Importantly, the plates are substantial enough to support the weld tips during application of electrode force upon work pieces sandwiched between the tips. Additionally, the weld gun arm is lighter in weight than conventional arms and requires less material to form.

The heat removal assemblies of the present invention offer several significant advantages over conventional cooling methods. The heat removal assemblies are part of an integrated welding system, thereby eliminating the need for complex customization of the cooling system. An integrated system also eliminates the maintenance costs associated with custom designed water and air-cooling systems that have been necessary for the operation of electric weld guns. Further, by including the cooling system with the electric welding gun, the stability of the cooling system is no longer a rate-limiting step. In fact, the combination of cooling systems disclosed herein allows for optimization of the systems before installation. Thus, the rate of failure for a welding apparatus having an integral cooling system is substantially lower than that of an continuously supplied, customized cooling system. Additionally, the welding systems of the present invention may be implemented in areas where external supplies of cooling water are limited or are non-existent, since the cooling systems are integral with the welding guns.

BRIEF DESCRIPTION OF THE DRAWINGS

A number of features and advantages of the present invention will become apparent from the detailed description of the invention that follows and from the accompanying drawing, wherein.

DETAILED DESCRIPTION OF THE INVENTION

As noted above, extreme temperatures during welding operations can damage electrode tips as well as cause imperfections in the welded work piece. However, the present invention is directed to modifying a conventional weld gun to allow for an efficient transfer of heat away from the electrode tip or from any other component of the weld gun, such as from the welding control unit, transformer, and secondary (i.e., high current) cable disposed between the electrodes and the transformer, through any combination of various internal, external and structural features without requiring a continuous supply of cooling liquid such as water.

Figure 1:
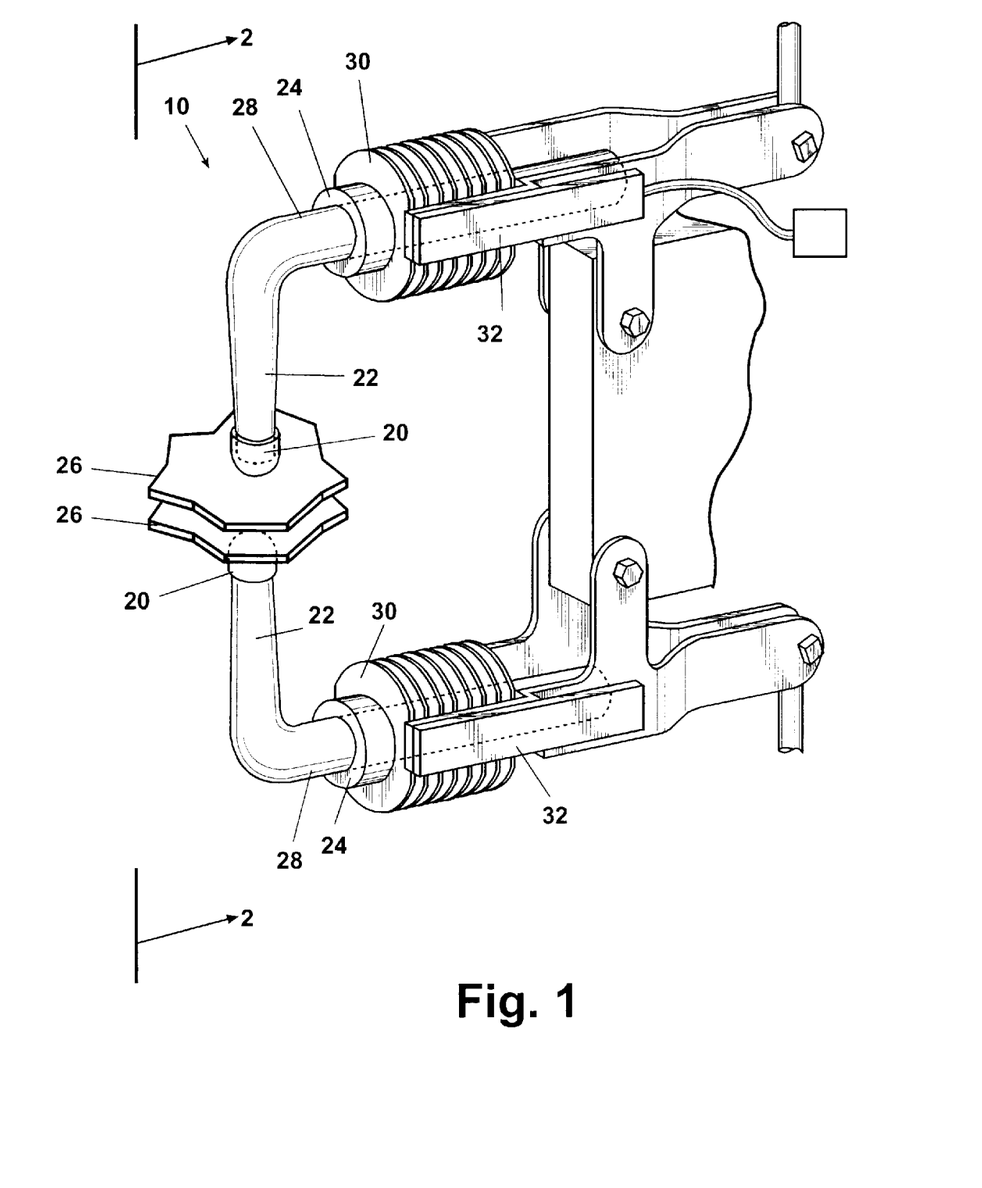
FIG. 1 is a perspective view of one form of an electrical resistance weld gun incorporating features of the present invention.
Figure 2:
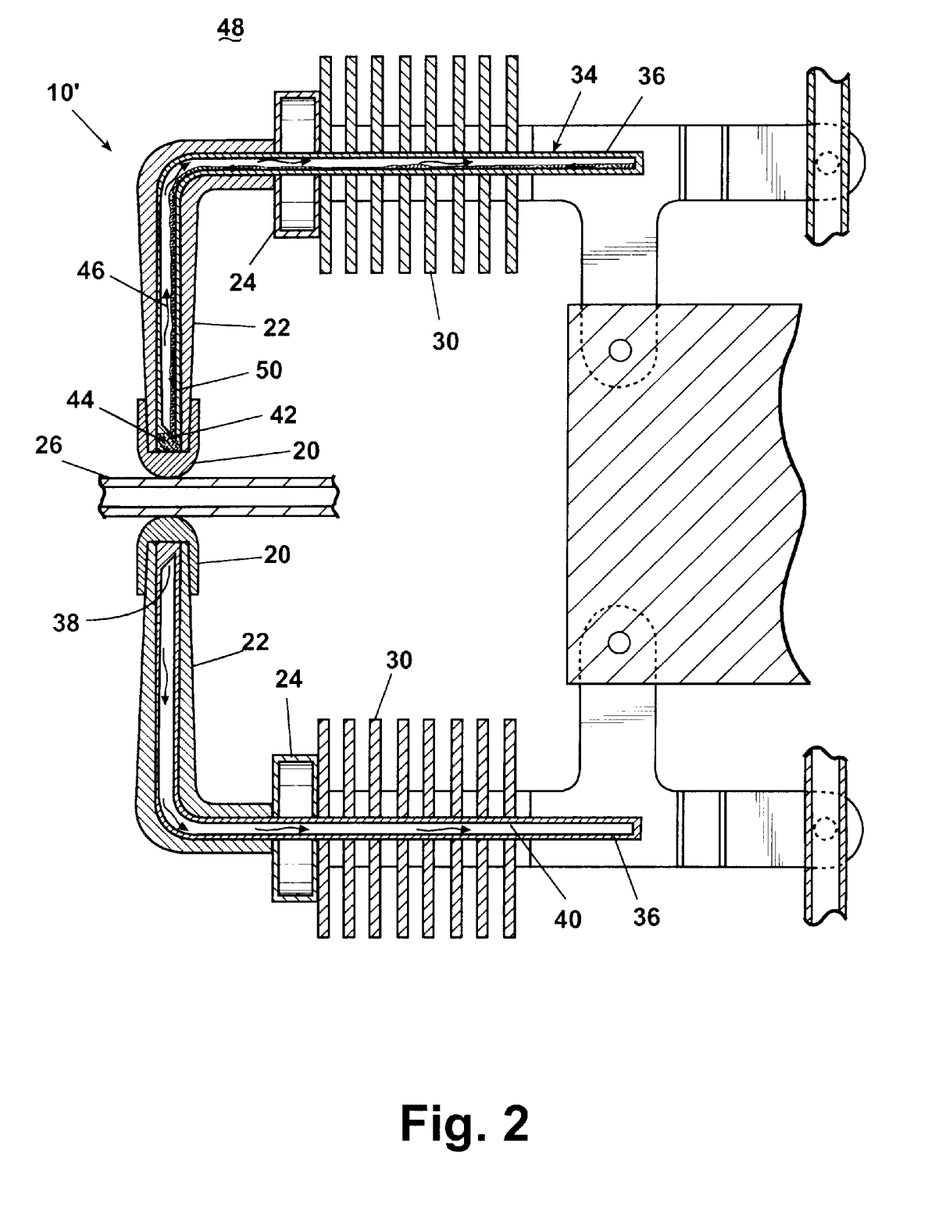
FIG. 2 is a cross-section along line 2—2 of FIG. 1 showing an internal cooling system of the present invention and including a heat tube system.

Internal features used to conduct heat away from the electrode tips are shown in FIGS. 1–3. In general, a weld gun 10 includes opposing positive and negative electrode tips 20 at distal ends of electrodes 22. The electrodes may be secured to the gun with electrode collars 24 that allow easy replacement of the electrodes as necessary. It should be noted that the shape of the electrode tips 20 and electrodes 22 are a matter of design choice, and may have any desired shape to accomplish welding in any given geometry and location.

As is well known, the electrode tips are continuously separable through a predetermined range for providing welding current through a work piece, and are usually connected to a welding secondary circuit, a resistance-based force controller and an actuator operatively coupled to the weld gun for moving the electrodes to any one of a plurality of electrode separation distances within a predetermined range.

In operation, work pieces 26 are inserted and compressed between the opposed tips 20 and a large current is allowed to flow between the electrodes 22. The work pieces 26 have a higher electrical resistance than the electrodes 22 such that the portion of the work pieces 26 compressed between the tips 20 heats up and becomes molten as the current flows between the tip. The molten material then compresses together due to pressure exerted between the tips. When the current is interrupted, the molten portions of the work pieces cool and solidify, thereby interconnecting the work pieces with a weld nugget (not shown).

As seen in FIG. 1, an upper portion 28 of the electrodes 22 is surrounded by a series of spaced fins 30. As may be appreciated, as work pieces 26 heat up, a certain amount of heat is deposited in the electrode tips 20 and into the electrodes 22. The addition of fins 30 on the exterior of electrodes 22 allows dissipation of the heat deposited in the tips 20 and electrodes 22. The fins 30 may further be structurally supported by bus bars 32. The fins 30 and bus bars 32 may be formed from the same materials as the electrodes 22 and the tips 20, such as from copper or aluminum. In such a construction, current may be supplied to the electrodes through bus bars 32, so that the bus bars perform both structural and electrical functions. The weld gun 10 of FIG. 1 may be used in situations where the elapsed time between welds is relatively large, thereby allowing heat generated at the work pieces 26 to be adequately dissipated by the fins 30 between welds.

However, it is generally more economical to shorten the weld cycle time. In such a situation, the size and number of fins 30 may be varied, along with the size and thickness of the electrodes 22 to provide for a faster cooling and greater heat capacity in the weld gun. For fast weld cycle times, the size of the weld gun may become too large for economical welding. Thus, additional cooling structure may be provided.

A slightly modified weld gun of FIG. 1 is shown in cross-section in FIG. 2, including one additional form of internal cooling. In addition to fins 30 for cooling, weld gun 10' includes a heat tube system 34. The heat tube system 34 of FIG. 2 is a self-contained closed-loop type of heat tube system that transfers heat by changing the phase of coolant from a liquid to gas and back to liquid again, which is capable of transferring heat on the order of one hundred (100) times faster than natural processes. Using heat tube system 34, the size of the weld gun may be reduced by a minimum of about thirty percent (30%) or more, thereby reducing the size of the apparatus and allowing the guns to be used in most applications.

Alternately, the heat tube system 34 of FIG. 2 may utilizes an entirely liquid coolant system. The liquid coolant performs in substantially the same way as the phase change coolant, except for the absence of the phase change. For example, the operation of the weld gun electrode tips heats the liquid coolant. The liquid coolant expands, causing convection currents to form, forcing the liquid coolant to an adjacent area where it is convectively cooled, thus transferring the heat to the ambient air. The cooling causes the liquid coolant to contract, which in turn causes more heated liquid coolant to flow from the area adjacent to the electrode tips. The cooled liquid coolant can then be returned to and reheated in the area adjacent to the electrode tips. While a liquid coolant is suitable, a phase change coolant is preferred because of the greater efficiency in heat transfer, thus only the operation of the weld gun with the phase change heat tube system is discussed below.

Structurally, each electrode 22 is formed with an internal tube 36 that interconnects an area 38 adjacent the electrode tips 20 with an area 40 adjacent the fins 30. The area 38 forms a reservoir 42 inside tip 20 where a liquid coolant 44 collects. As the weld gun 10' operates, a portion of the heat generated in work pieces 26 also collects in the tips 20. The liquid coolant 44 absorbs the heat from the tips 20, causing a portion of the coolant to vaporize. Vaporized coolant 46 then fills the tube 36. In this way, heat contained within the vaporized coolant flows to the area adjacent the fins 30. Upon reaching the area at adjacent the fins, the vaporized coolant is convectively cooled, thereby transferring the heat to the fins for dissipation to ambient air 48. As the vaporized coolant 46 cools, it condenses back to liquid form, with at least two effects. First, as the coolant condenses, pressure in the area 40 adjacent the fins decreases, causing more vaporized coolant 46, carrying more heat, to flow toward the fins. Second, the liquid coolant adjacent the fins 30 flows back towards the reservoir 42 for reheating.

Flow of liquid coolant from the area 40 adjacent the fins back to the reservoir 42 may be accomplished in several ways. First, as shown in the upper weld arm of FIG. 2, the liquid coolant near the fins may flow back to the reservoir by gravitational flow, as indicated by arrow 50. Alternative configurations for returning coolant to the reservoir 42 are illustrated in FIGS. 3A–3D.

Figure 3A:
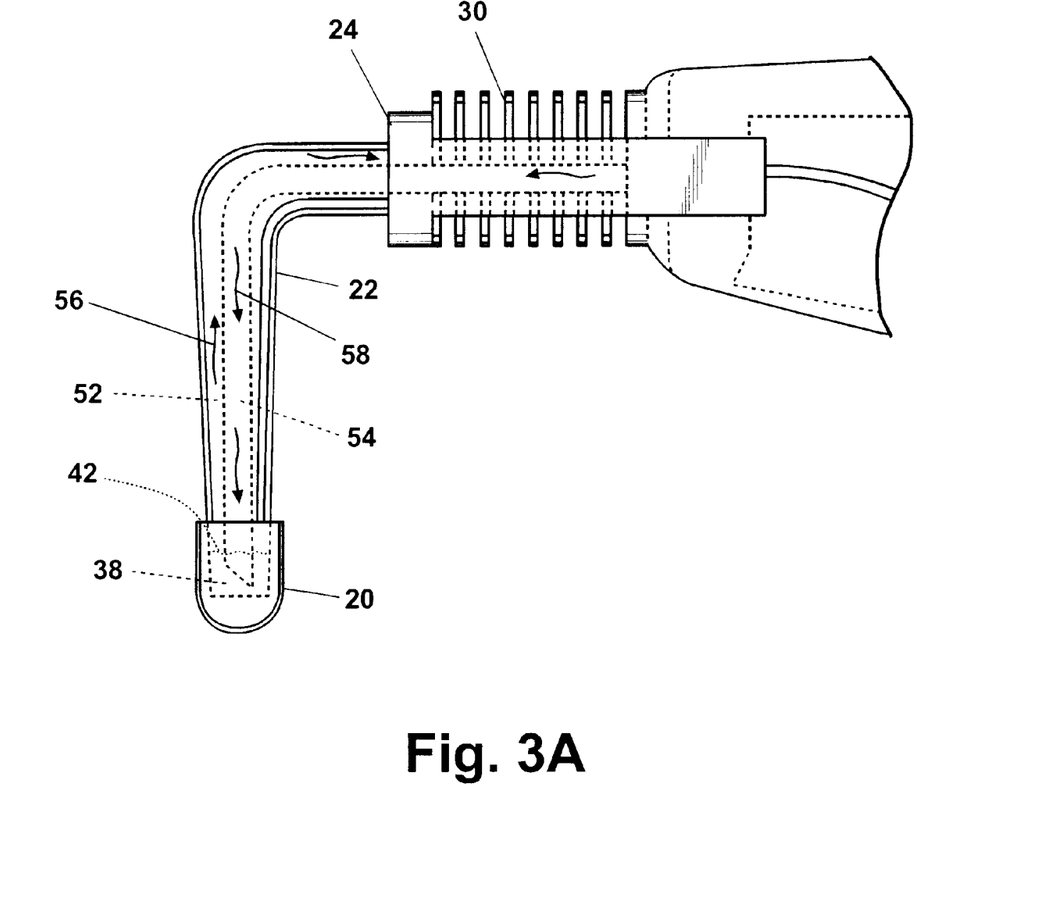
FIGS. 3A–3D show other forms of internal cooling systems according to the present invention.

The heat tube system 34 of FIG. 3A includes concentric outer and inner tubes 52, 54 formed within the electrode 22. Both tubes 52, 54 interconnect the fins 30 with the reservoir 42. As indicated by arrow 56 in FIG. 3A, vapor flows through outer tube 52 from the reservoir 42 to the fins 30, where it is cooled and condensed. Then, the condensed liquid coolant flows down inner tube 54 back to the reservoir, as indicated by arrow 58. Of course, flow paths may be reversed, as long as vapor flows one way and liquid flows the other.

Figure 3B:
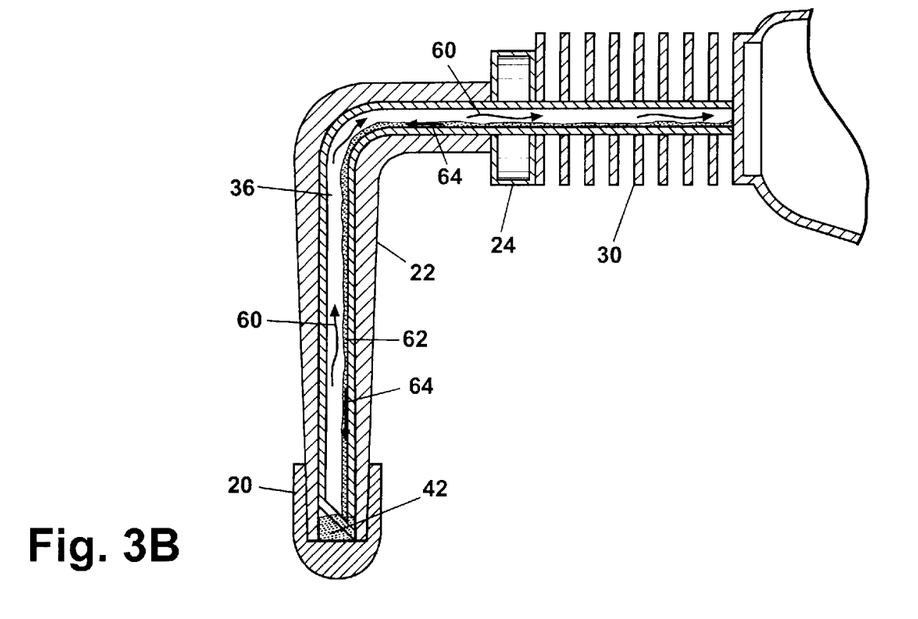
Figure 3C:
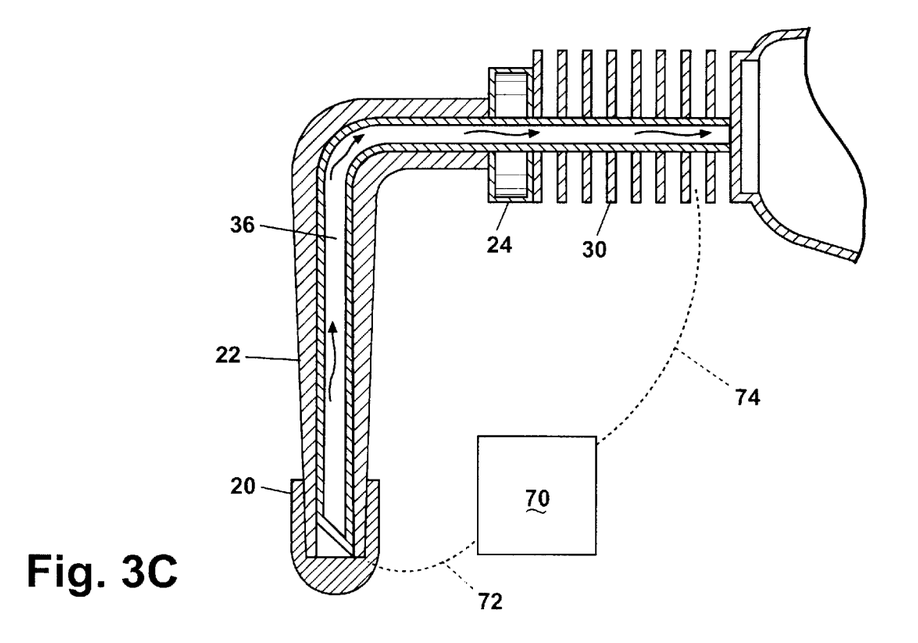
Figure 3D:
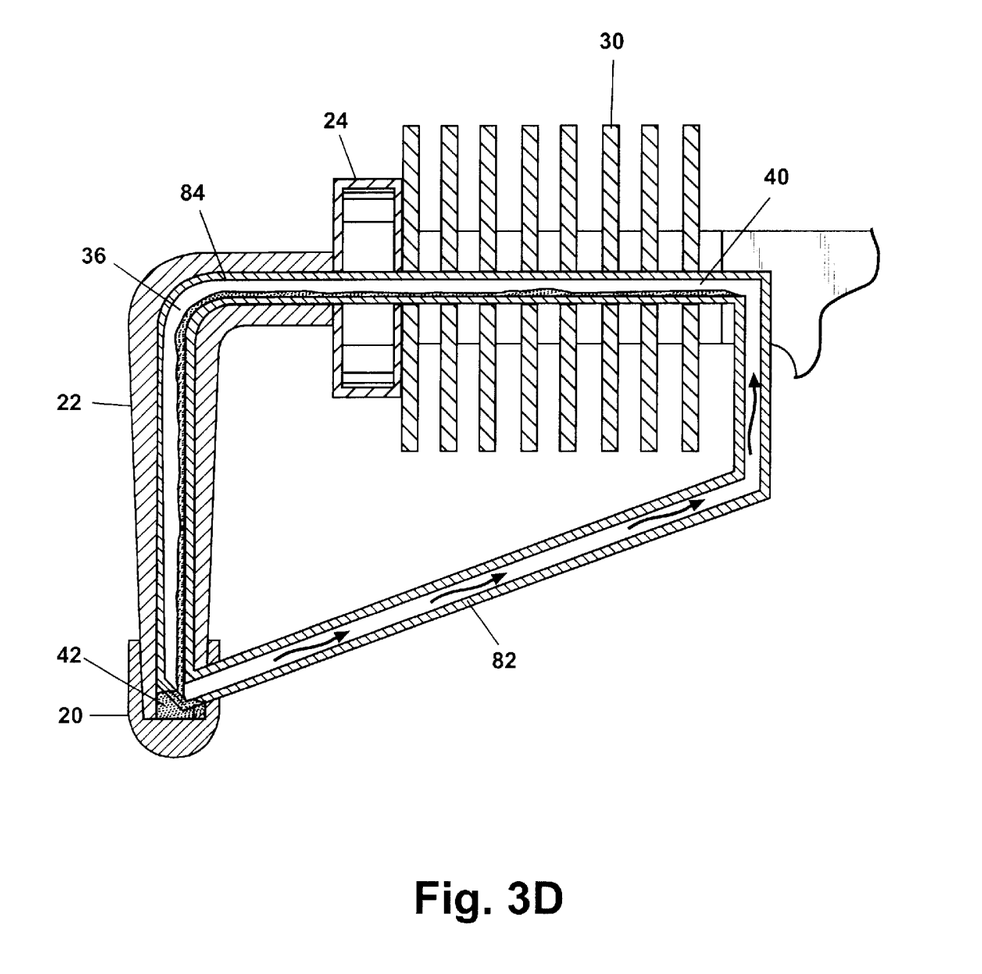

The electrode 22 may also be formed with only a single internal tube 36, as seen in FIGS. 3B–3D. In FIG. 3B, vaporized coolant flows from reservoir 42 towards the fins 30, as indicated by arrow 60, where the vaporized coolant is cooled and condensed to liquid. The inner surface of tube 36 further includes a wicking material 62 that causes the condensed liquid coolant to flow from the fins back to the reservoir 42, as indicated by arrow 64.

The heat tube 36 of FIG. 3C differs slightly from that shown in FIG. 3B, and is utilized in systems where the amount of heat removed from the electrode tip 22 is to be tightly controlled or where a completely closed system, as in FIG. 3B, is impractical. Specifically, an external pump and holding tank 70 is connected to the reservoir 42, indicated by the dashed line 72. At predetermined times during a weld cycle, or in response to predetermined conditions, a metered dose of liquid coolant is delivered through connection 72 to the reservoir 42. As the electrode tip 22 heats the liquid coolant, it vaporizes, and the vaporized coolant flows through the tube 36 toward the fins 30, where it is cooled and condensed. The condensed liquid coolant is then pumped or transferred back to the holding tank 70, as indicated by the dashed line 74. Of course, the liquid coolant may be discarded after cooling by the fins 30, in which case the dashed line 74 would be eliminated. However, where a closed system is preferred, the coolant is continuously reused to cool the electrode tips 20. The external holding tank 70 may also be used as a back-up or redundant coolant device to provide additional coolant to the electrode tip 20 if the temperature of the tip rises beyond a pre-set temperature point to minimize the possibility of tip damage or failure.

Lastly, FIG. 3D shows an alternative flow pattern for coolant through a circular flow path 80. Internal tube 36 provides a flow path between the reservoir 42 and the fins 30 where the coolant flows continuously in one direction. In FIG. 3D, the indicated flow path is counterclockwise from the reservoir 42 through a vapor tube 82 to the area 40 adjacent fins 30, and back through liquid tube 84 that is shown inside the electrode 22. Of course, the coolant flow direction may differ, and other secondary cooling features may be interconnected to vapor tube 82 to provide cooling thereto. A further advantage of this design is that tube 82 may be exposed to ambient air without substantial associated structure, aiding in the cooling process.

Figure 4:
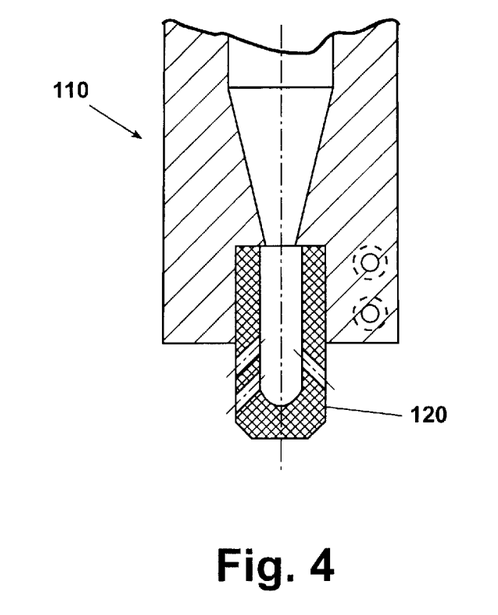
FIG. 4 is a cross-section of a weld tip having a heat capacity according to a second embodiment of the present invention.

In addition to providing internal structures for removing heat from the electrode tips 20, external structures may also be utilized. As seen in FIG. 4, a weld gun 110 may include an electrode tip 120 having a larger wall thickness or metal mass capable of storing the heat generated during a complete weld cycle. In certain situations, it is desirable to directly conduct heat away from the weld gun, particularly where the complexity of internal cooling structures is undesirable or where the weld gun experiences a period of inactivity between weld cycles.

For example, the electric welding gun may cycle through various locations, i.e. between an operational position with a work piece 26 and a resting position with an external heat sink. The work pieces may be placed on a moving platform that manipulates the work pieces for a welding operation with a movable weld gun. After the work piece is manipulated, the weld gun may move toward the work piece to perform a weld cycle, after which the weld gun moves away from the work piece to allow movement of the piece and manipulation of the next piece to be welded. It is therefore desirable for the weld gun to move to a resting position. Since the weld gun is moved to a resting position, external heat sinks may be provided to directly conduct heat away from the electrode tips while the work piece is being manipulated, thereby providing fast and efficient cooling of the weld gun with higher heat transfer efficiency than convection cooling. That is, the welding gun would make one or more welds on a work piece, and then park the electrode tips in or on an external heat sink, thus directly dissipating heat from the weld gun tips. While the electrode tips were being cooled, the work piece could be manipulated. This cycle could be repeated ad infinitum.

Figure 5:
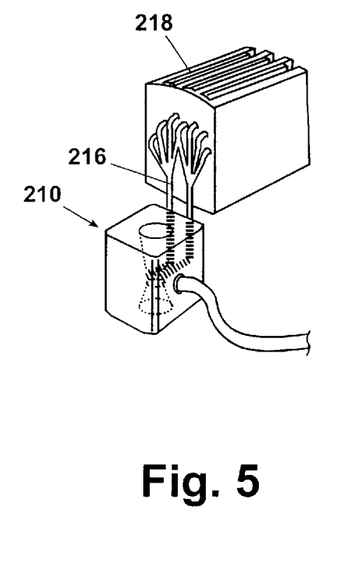
FIG. 5 is one form of an external cooling system of the present invention used in conjunction with the weld tip of FIG. 4.
Figure 6:
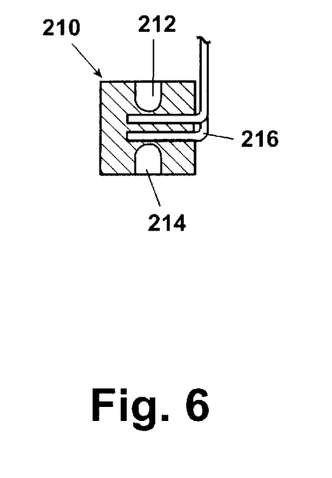
FIG. 6 is a cross-section of the external cooling system of FIG. 5 taken along line 6—6.

One type of externally applied heat sink 210 is shown in FIGS. 5 and 6. The heat sink 210 is formed as a cube or other convenient geometrical shape having cavities 212, 214 preferably sized and shaped to tightly receive upper and lower electrode tips 120 (FIG. 4). Heat sink 210 may be mobile, as, for example mounted on a robotic arm that moves the heat sink toward the weld gun, but is preferably stationary so that the weld gun is moved to a resting position in contact with the heat sink. More preferably, the heat sink is mounted on a pedestal or table such that the electric welding gun moves to and makes contact with the heat sink.

Heat sink 210 is shown as approximately cube shaped in FIGS. 5 and 6. However, the size and shape of the heat sinks are defined only by the operational requirements of the electrode tips to be cooled. Further, while the electrode tips 120 may rest on the surface of the heat sink 210, it is preferable for at least a portion of the electrode tips to be received within the cavities 212, 214. The cavities 212, 214 are therefore contoured to contact as much of the external surface of the electrode tips 120 as possible to allow for a large contact area between the weld gun and the heat sink, which encourages rapid cooling of the electrode tips. As seen in FIG. 5, the depth of the cavities 212, 214 is less than about half the thickness of the heat sink, which prevents the electrode tips from touching.

The heat sink may consist of any material, i.e. metal, plastic, ceramic, etc, with appropriate heat dissipation characteristics. Preferably, the heat sink is made of copper or aluminum to allow for rapid conductive cooling of the electrode tips 210. Specifically, since the heat sink is placed into direct contact with electrode tips 120, heat is rapidly conducted away from tips 120 into the heat sink 210, thereby removing the heat from the electrode tips very rapidly. Additionally, the heat sink 210 may include further features for dissipation of heat to ambient air after transfer to the heat sink from the electrode tips. For example, heat tubes 216 may interconnect the heat sink 210 with a radiator 218 having a relatively large surface area for convective cooling to ambient air. However, the heat sink 210 may include surface features that facilitate direct convection cooling of the heat sink. Any surface feature that increases the overall surface area of the heat sink, such as fins, is suitable.

Figure 7:
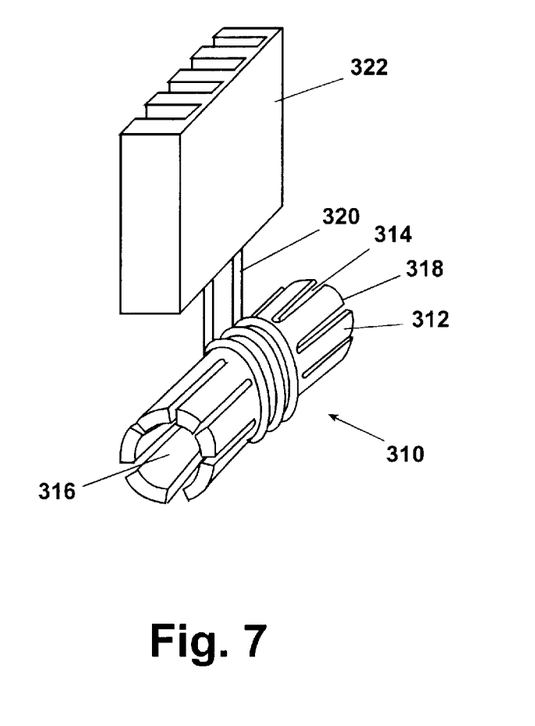
FIG. 7 is a second form of an external cooling system of the present invention for use in conjunction with the weld tip of FIG. 4.

In some welding applications, the shape of the electrode tips may change slightly over the life of the tip. In these situations, it may be desirable to have conformable heat sinks into which the electrode tips 120 may be placed in the resting position. One such configuration is shown in FIG. 7. Instead of a cube-shaped heat sink, a collet-style receiver 310 is shown having movable, resilient fingers 312 separated by gaps 314. As opposing electrode tips 120 are moved to the resting position, they are inserted into opposite ends 316, 318 of collet 310. As the tip 120 is inserted, the fingers 312 are forced outwardly and exert a resilient force radially inwardly onto the tip 120. In this way, positive contact between the electrode tip and the fingers 312 is achieved, thereby allowing conduction of heat from the electrode tip 120 to the collet 310. Heat maybe further conducted away from the collet along heat tube 320 to a convectively cooled device, such as fins 322.

Figure 8:
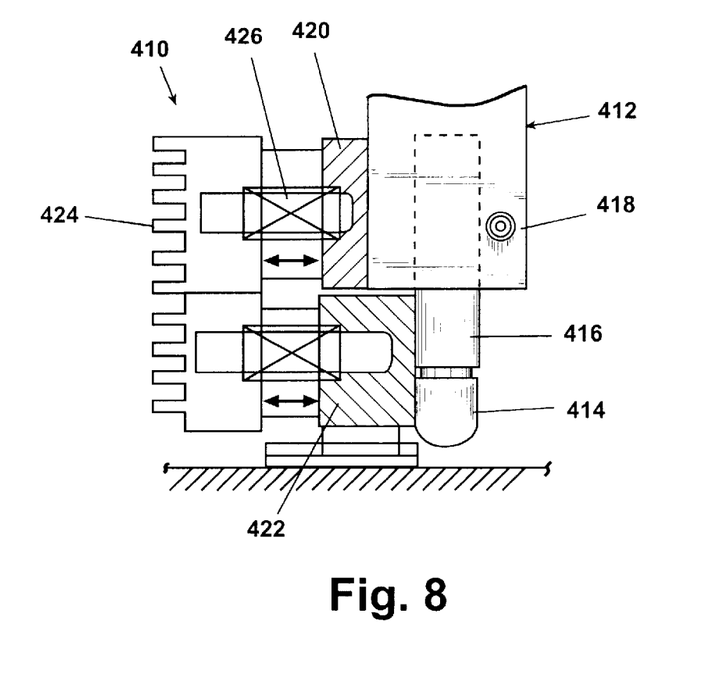
FIG. 8 is a third form of an external cooling system of the present invention for use in conjunction with the weld tip of FIG. 4.

However, it may be impractical to insert opposing electrode tips into a single device to allow heat conduction away from the tips. To address such a situation, a clamshell style heat sink 410 is shown in FIG. 8 for use with any style of weld gun. Weld gun 412 includes an electrode tip 414 and an electrode 416. The gun 412 may also include a support structure 418. During a weld cycle, heat generated from welding is stored in the tip 414, in the electrode 416, and in the support structure 418. Of course, the heat capacity of the weld gun may be adjusted as necessary by increasing or decreasing the mass of the various components of the gun 412.

After completing a weld cycle, weld gun 412 is moved to a resting position where externally cooled heat sinks may be positioned in contact with the exterior of the gun. For example, as seen in FIG. 8, an upper heat sink 420 may be moved into contact with the support structure 418, and a lower heat sink may be moved into contact with the electrode tip 414 and the electrode 416. In general, the heat sink may be one or more pieces that conform to the external shape of the weld gun 412 so that a large surface area of contact occurs, thereby allowing heat to be conducted away from the weld gun. As such, the heat sink may be applied to the entire exterior surface of weld gun 412, or only to a portion of the gun exterior surface, so long as effective heat conduction occurs between the gun and the heat sink. Additionally, the heat sinks may be attached to secondary heat dissipation devices, such as fins 424. However, the secondary heat dissipation devices need not be adjacent the weld gun, thereby saving space. Instead, devices such as heat tubes 426 may be used to draw heat away from the heat sinks 420, 422 to remotely located fins 424.

It may not always be practical to utilize a relatively large electrode tip 120 to act as a heat capacity until it contacts an external heat sink. In certain situations, it may be more practical to combine the heat capacity with the cooling device. It is well known that the convection cooling of a body increases proportional to the ratio of surface area to mass. Thus, it is advantageous to increase the surface area to mass ratio to increase the cooling of the weld arm by convection. This adjustment of the surface area to mass ratio must be balanced with the necessity for sufficient strength in each weld arm as a work piece is clamped between opposing weld arms t exert the force necessary to create an adequate weld.

Figure 9:
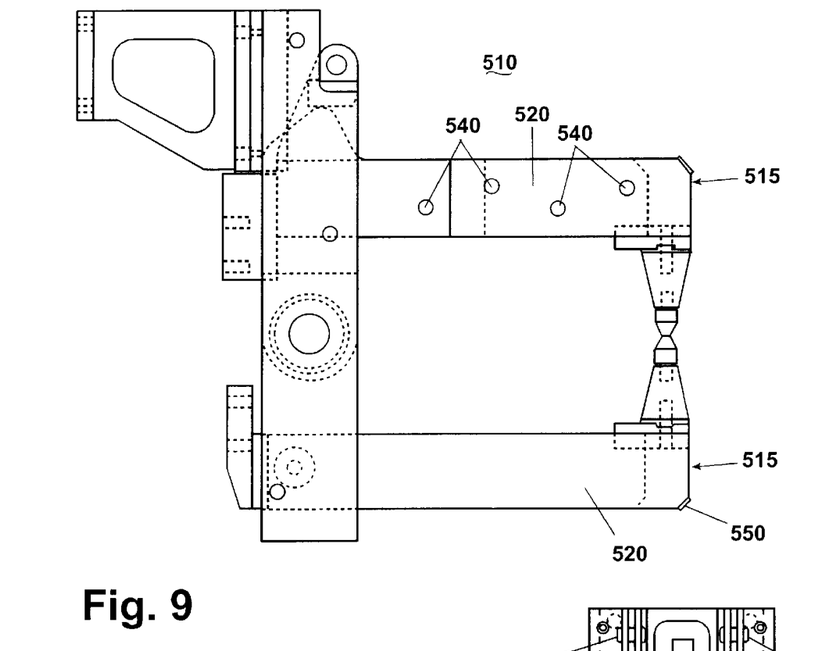
FIG. 9 is an elevational view of a weld gun having structural features for removing heat generated at the electrode tip.
Figure 10:
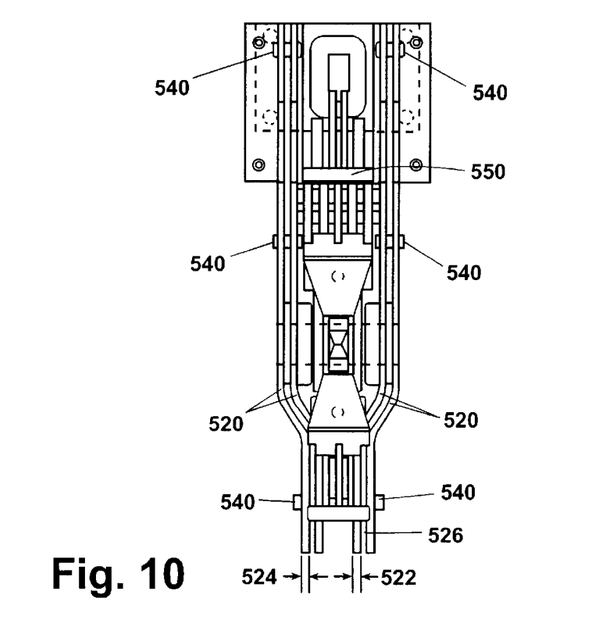
FIG. 10 is a front view of the weld gun of FIG. 9.

In a third assembly, the weld gun itself becomes both the heat capacity and the heat sink provided with convection cooling. In FIGS. 9–10, a weld gun 510 having a multi-plate construction of weld arms 515 is constructed of a series of flat parallel plates 520 having a thickness or thicknesses 522, 524 and separated by air gaps 526 having a width between approximately three to six thicknesses of each plate 520. The air gaps 526 can be made narrower where necessary to increase the strength of the arms 515, and especially where forced air can be used for cooling. However, an air gap width of four plate thicknesses has been found optimal for cooling by convection without forced air flow. It is also apparent that as the weld gun 510 is opened and closed by robotic action, the movement will force some air through the air gaps 526. The plates 520 are further connected and maintained in generally parallel relationship by a series of transverse pins 540 and braces 550 to hold the plates in position and to provide transverse reinforcement against buckling of the thin plates 520. The series of plates 520, air gaps 526 and pins 540 and braces 550, as assembled, exhibit sufficient strength in the compressive direction of the weld arms 515. Of course, the plates 520 may be oriented substantially parallel to any plane so long as the assembly is able to withstand compressive force in a direction defined by the range of motion of the electrodes about a pivot point. The use of multiple plates 520, rather than a solid bar, increases the surface area of the body of each weld arm 515. The multiple plates 520, as reinforced, also provide the lateral stability required with less mass than a structurally equivalent solid bar.

The ratio of mass to surface area is thus reduced. The individual plates 520 of the weld arms 515 serve much the same purpose as a conventional heat sink with radiating fins, eliminating the cost and space requirement for fins installed externally on the weld arm. By reducing the space allotted to the weld gun 510, the overall apparatus can be more compact. The weld gun 510 is lighter, takes no more space than a weld gun of conventional design, and has increased surface area (and surface area-mass ratio) to provide more efficient cooling of the material of the weld gun 510. Additional cycle time is therefore not required to allow sufficient cooling of the weld gun 510 and the actuator mechanism (not shown) of the weld gun 510 requires less power to move the lighter weld gun through its operating cycle.

Figure 11:
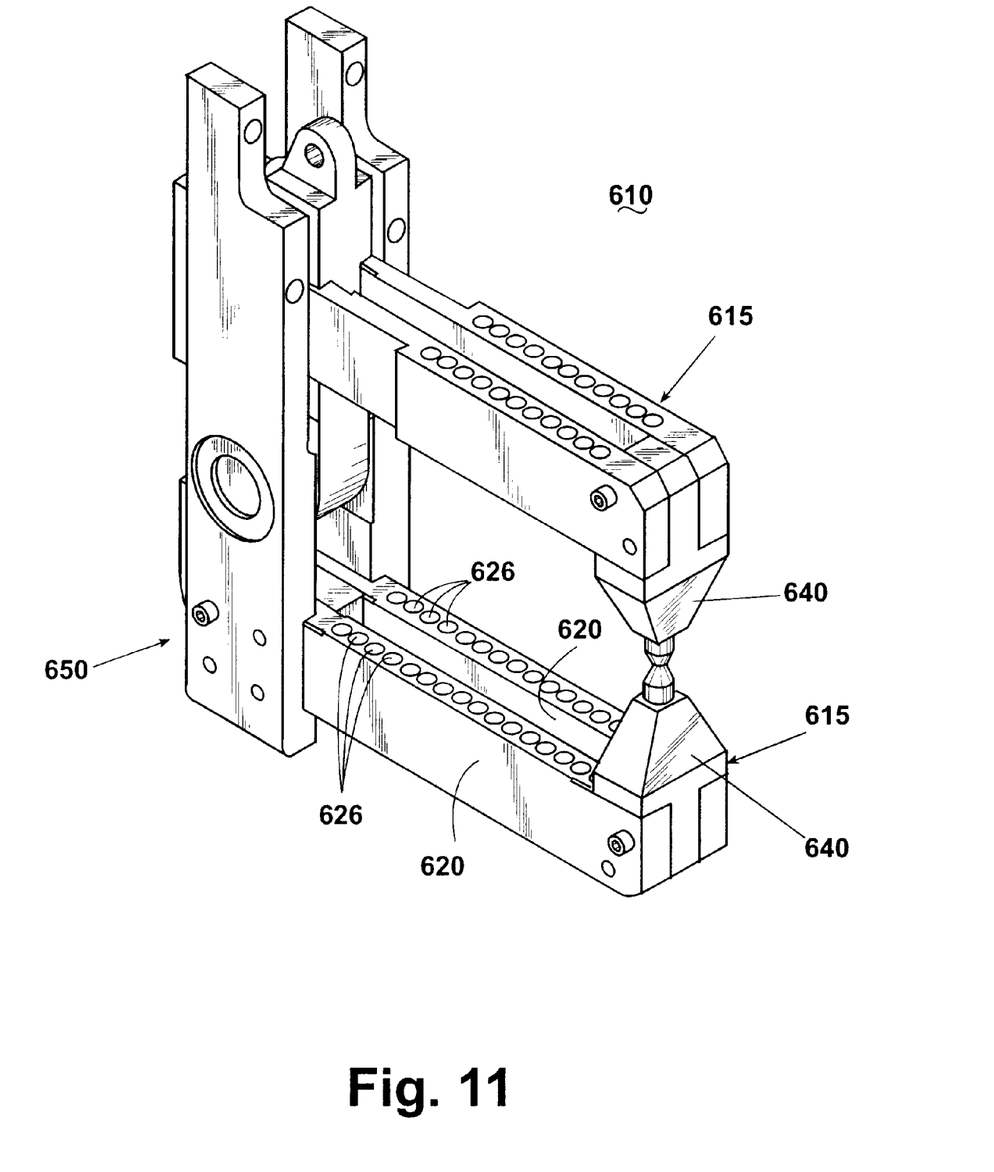
FIG. 11 is a perspective view of a further embodiment of a weld gun having structural features for removing heat generated at the electrode tip.

In a further embodiment of a weld gun 610 with multi-plate weld arm construction according to the invention, shown in FIG. 11, the weld gun arms 615 are fabricated of two thick plates 620 held in a spaced relationship at one end by electrode tips 640 and at an inner end by a pivot mechanism 650. Each of the plates 620 has a series of holes 626 drilled parallel to a side face, substantially parallel to the direction of compression of the weld gun 610. The holes 626 serve the same function as the interstitial voids 526 of the first embodiment, reducing the weight of each of the thick plates 620 and increasing the surface area available for the convection of heat away from the weld gun arms 615. The ratio of mass to surface area is further decreased, increasing the cooling efficiency of the arms 615.

Although certain preferred embodiments of the present invention have been described in detail, many physical changes could be made to the apparatus without altering the inventive concepts and principles embodied therein. The invention is not to be limited to the illustrations described and shown herein, which are deemed to be merely illustrative of the best modes of carrying out the invention. A person of ordinary skill in the art will realize that certain changes and modifications will come within the teachings and range of equivalency of the invention and that such changes and modifications are within its spirit and the scope as defined by the claims.

What is claimed is:

1. An all electric welding system, comprising:
   an electric welding gun, said gun having opposed electrodes, each of said electrodes terminating in an electrode tip;
   said electrode tip including an internal reservoir containing a predetermined amount of coolant for cooling said tip; and
   said electrode including an internal pipe for connecting said electrode tip to a secondary heat removal system.

2. The welding system of claim 1, wherein said gun further includes at least one fin for dissipating heat to ambient air by convection cooling.

3. The welding system of claim 1, wherein said secondary heat removal system is a series of fins attached to said electrode.

4. The welding system of claim 1, wherein sad internal pipe is a heat pipe.

5. The welding system of claim 4, wherein said heat pipe allows bi-directional coolant flow.

6. The welding system of claim 5, wherein heated, vaporized coolant moves from said electrode tip to said secondary heat removal system through said heat pipe and wherein condensed liquid coolant moves from said secondary heat removal system through said heat pipe to replenish said reservoir.

7. The welding system of claim 4, further including a holding tank and a pump for injecting a predetermined dose of coolant into said reservoir in response to predetermined conditions.

8. The welding system of claim 7, wherein heated, vaporized coolant moves from said electrode tip to said secondary heat removal system through said heat pipe and wherein condensed liquid coolant moves from said secondary heat removal system to said holding tank.

9. The welding system of claim 1, further including a second pipe interconnecting said secondary heat removal system to said reservoir to allow condensed liquid coolant to return to said reservoir.

10. The welding system of claim 5, wherein heated liquid coolant moves from said electrode tip to said secondary heat removal system through said heat pipe and wherein cooled liquid coolant moves from said secondary heat removal system through said heat pipe to replenish said reservoir.

11. The welding system of claim 7, wherein heated liquid coolant moves from said electrode tip to said secondary heat removal system through said heat pipe and wherein cooled liquid coolant moves from said secondary heat removal system to said holding tank.

12. The welding system of claim 1, further including a second pipe interconnecting said secondary heat removal system to said reservoir to allow cooled liquid coolant to return to said reservoir.

13. An all electric welding system, comprising:
   an electric welding gun, said gun having opposed electrodes, each of said electrodes terminating in an electrode tip; and
   wherein said electrode tip further includes a heat capacity capable of storing heat generated during a weld cycle having a predetermined time duration.

14. The welding system of claim 13, wherein said weld gun is movable from an operational position to a resting position, and wherein said heat capacity directly contacts a heat sink when said weld gun is in said resting position to conduct heat away from said heat capacity and into said heat sink.

15. The welding system of claim 14, wherein said electrodes are inserted into at least a portion of said heat sink to achieve positive contact with said heat sink.

16. The welding system of claim 15, wherein said heat sink includes cavities sized and shaped to receive said electrode tips.

17. The welding system of claim 15, wherein said electrodes are inserted into a collet, said collet defined by resilient fingers separated by gaps for gripping said electrodes.

18. The welding system of claim 15, wherein said heat sink is interconnected with a secondary heat removal system.

19. The welding system of claim 14, wherein said heat sink is movable to conform with and directly contact at least a portion of an exterior surface of said electrodes when said weld gun is in said resting position.

20. The welding system of claim 19, wherein said heat sink is a clamshell style.

21. An all electric welding system, comprising:
   an electric welding gun, having at least one fin for dissipating heat to ambient air by convection cooling said gun having opposed electrodes, each of said electrodes terminating in an electrode tip; and
   at least one weld gun arm connected to one of said electrodes, said arm formed of a plurality of thin plates separated by air gaps to increase the surface area to mass ratio of said arm for convection cooling, and wherein said thin plates are operably interconnected by a plurality of slotted bars.

22. The welding system of claim 21 wherein a thickness of said air gaps is between three and six times the thickness of each of said plates.

23. The welding system of claim 24, wherein a thickness of said air gaps is about four times the thickness of each of said plates.

24. The welding system of claim 21 further comprising a system for forcing air flow over said plates.

25. The welding system of claim 21, wherein said plates having a plurality of apertures therethrough to increase surface area to mass ratio for convection cooling.

26. An electric welding system, comprising:
   an electric welding gun, said gun having opposed electrodes, each of said electrode terminating at a first end in an electrode tip that is continuously separable through a predetermined range for providing welding current through a work piece;
   said welding gun capable of movement between an operating and a resting position wherein said gun moves to said resting position after completing a weld cycle; and
   an external heat sink adjacent said weld gun in said resting position, at least a portion of said heat sink in direct contact with an external surface of said gun to conduct heat away from said weld gun to a secondary heat removal mechanism.

* * * * *

UNITED STATES PATENT AND TRADEMARK OFFICE
CERTIFICATE OF CORRECTION

PATENT NO. : 6,573,470 B1  
APPLICATION NO. : 09/715346  
DATED : June 3, 2003  
INVENTOR(S) : Ronald C. Brown et al.

It is certified that error appears in the above-identified patent and that said Letters Patent is hereby corrected as shown below:

\*\* In the claims:

Column 12, line 44, claim 23, change "24" to -- 21 --. \*\*

Signed and Sealed this

Tenth Day of July, 2007

JON W. DUDAS  
*Director of the United States Patent and Trademark Office*